(12) United States Patent
Bainbridge et al.

(10) Patent No.: US 7,802,145 B1
(45) Date of Patent: Sep. 21, 2010

(54) APPROACH FOR FACILITATING ANALYSIS OF COMPUTER SOFTWARE ERRORS

(75) Inventors: David K. Bainbridge, Acton, MA (US); Mickael Graham, Hopkinton, MA (US); Neil Russell, Wakefield, MA (US)

(73) Assignee: Cisco Technology, Inc., San Jose, CA (US)

( * ) Notice: Subject to any disclaimer, the term of this patent is extended or adjusted under 35 U.S.C. 154(b) by 1027 days.

(21) Appl. No.: 10/848,644

(22) Filed: May 18, 2004

(51) Int. Cl.
*G06F 11/00* (2006.01)

(52) U.S. Cl. ........................................... 714/38; 714/47

(58) Field of Classification Search ................... 714/15, 714/20, 48, 38, 47
See application file for complete search history.

(56) References Cited

U.S. PATENT DOCUMENTS

| | | | | |
|---|---|---|---|---|
| 4,458,307 A * | 7/1984 | McAnlis et al. | ................ | 714/22 |
| 5,155,731 A * | 10/1992 | Yamaguchi | ................... | 714/45 |
| 5,237,699 A * | 8/1993 | Little et al. | .................... | 714/23 |
| 5,245,615 A * | 9/1993 | Treu | ............................ | 714/45 |
| 5,410,545 A * | 4/1995 | Porter et al. | ................. | 714/723 |
| 5,463,768 A * | 10/1995 | Cuddihy et al. | ................ | 714/37 |
| 5,495,573 A * | 2/1996 | Datwyler et al. | ............... | 714/48 |
| 5,506,955 A * | 4/1996 | Chen et al. | ..................... | 714/26 |
| 5,596,716 A * | 1/1997 | Byers et al. | .................... | 714/48 |
| 5,634,000 A * | 5/1997 | Wicht | ........................... | 714/10 |
| 5,774,647 A * | 6/1998 | Raynham et al. | .............. | 714/48 |
| 5,819,028 A * | 10/1998 | Manghirmalani et al. | ..... | 714/57 |
| 5,935,262 A * | 8/1999 | Barrett et al. | ................. | 714/46 |
| 6,061,810 A * | 5/2000 | Potter | ........................... | 714/23 |
| 6,073,255 A * | 6/2000 | Nouri et al. | ................... | 714/31 |
| 6,088,816 A * | 7/2000 | Nouri et al. | ................... | 714/31 |
| 6,138,250 A * | 10/2000 | Nouri et al. | ................... | 714/31 |
| 6,145,098 A * | 11/2000 | Nouri et al. | ................... | 714/31 |
| 6,161,200 A * | 12/2000 | Rees et al. | ..................... | 714/38 |
| 6,243,831 B1 * | 6/2001 | Mustafa et al. | ................. | 714/24 |
| 6,247,149 B1 * | 6/2001 | Falls et al. | ..................... | 714/45 |
| 6,345,322 B1 * | 2/2002 | Humphrey | ................... | 710/38 |
| 6,438,668 B1 * | 8/2002 | Esfahani et al. | ............. | 711/165 |
| 6,493,656 B1 * | 12/2002 | Houston et al. | ............. | 702/187 |
| 6,513,135 B2 * | 1/2003 | Harada | ......................... | 714/42 |
| 6,535,996 B1 * | 3/2003 | Brewer et al. | ................. | 714/14 |
| 6,539,341 B1 * | 3/2003 | Li et al. | ....................... | 702/187 |
| 6,543,010 B1 * | 4/2003 | Gaudet et al. | ................. | 714/45 |
| 6,598,012 B1 * | 7/2003 | Berry et al. | ................. | 702/187 |
| 6,598,179 B1 * | 7/2003 | Chirashnya et al. | ........... | 714/37 |
| 6,647,517 B1 * | 11/2003 | Dickey et al. | ................. | 714/48 |
| 6,976,197 B2 * | 12/2005 | Faust et al. | ................. | 714/723 |
| 7,036,049 B2 * | 4/2006 | Ali et al. | ....................... | 714/47 |

(Continued)

*Primary Examiner*—Robert Beausoliel
*Assistant Examiner*—Elmira Mehrmanesh
(74) *Attorney, Agent, or Firm*—Hickman Palermo Truong & Becker LLP

(57) ABSTRACT

An approach for facilitating the analysis of computer software errors generally involves logging status data in a volatile memory, such as a random access memory (RAM). The status data may indicate one or more attributes of a computing system or any of its components. The status data may be supplemented with additional status data to indicate attributes of the computing system and its components over time. In response to detecting a specified condition, the status data is written from the volatile memory to a non-volatile memory, for example, onto one or more disks. The status data stored on the non-volatile memory may then be used to analyze the behavior of the computer software over time leading up to the computer software error.

28 Claims, 5 Drawing Sheets

U.S. PATENT DOCUMENTS

| | | | |
|---|---|---|---|
| 7,146,533 B2 * | 12/2006 | Lindsay et al. | 714/20 |
| 7,146,544 B2 * | 12/2006 | Hsu et al. | 714/57 |
| 7,213,176 B2 * | 5/2007 | Banko | 714/38 |
| 7,219,260 B1 * | 5/2007 | de Forest et al. | 714/15 |
| 7,225,368 B2 * | 5/2007 | Lancaster | 714/48 |
| 2003/0115508 A1 * | 6/2003 | Ali et al. | 714/43 |
| 2005/0081019 A1 * | 4/2005 | DeWitt et al. | 712/227 |

* cited by examiner

FIG. 3A

| TIMESTAMP | EVENT CODE | SOURCE |
|---|---|---|
| 4/22/04:12:37:32 | 2387 | PROCESS A |
| 4/22/04:12:37:35 | 5492 | PROCESS B |
| 4/22/04:12:37:36 | 5496 | PROCESS A |

FIG. 3B

| EVENT CODE | DESCRIPTION |
|---|---|
| 2387 | Invocation of function ABC |
| 5492 | Invocation of function LMN |
| 5496 | Invocation of function XYZ |

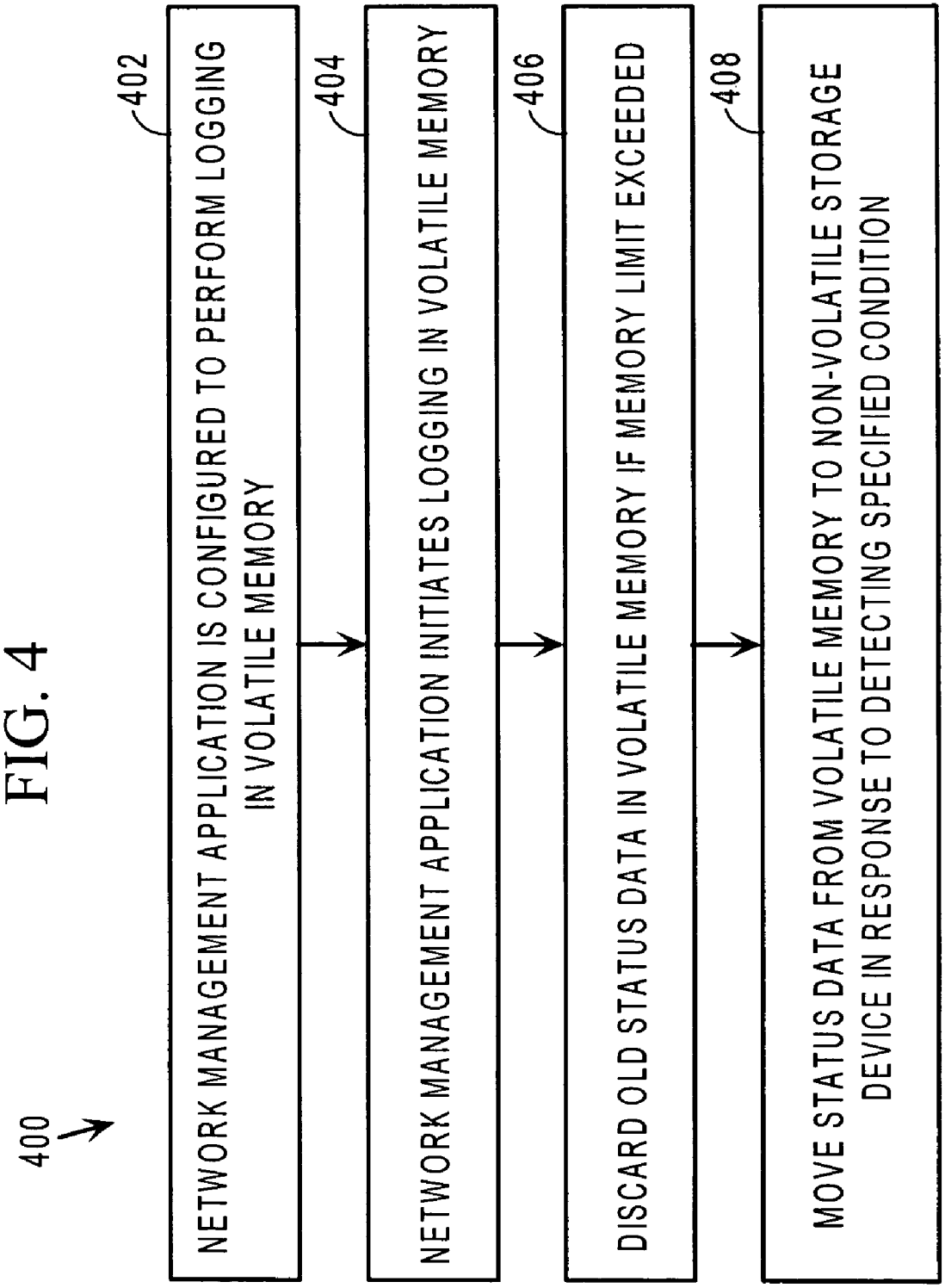

APPROACH FOR FACILITATING ANALYSIS OF COMPUTER SOFTWARE ERRORS

FIELD OF THE INVENTION

This invention relates generally to computer software, and more specifically, to an approach for facilitating analysis of computer software errors.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Business organizations spend large amounts of money, resources and time analyzing computer software errors to determine why the errors occurred and how to correct them. Analyzing computer software errors can be particularly problematic in complex software deployments, such as multi-processor/multi-threaded systems, where it is difficult, if not impossible, to reproduce the exact environment and conditions that existed at the time the errors occurred. As a result, several approaches and tools have been used to analyze computer software errors.

One approach has been to capture and store snapshot data at the time of a software error and then use the snapshot data to analyze the software error. Snapshot data is data that reflects one or more attributes of the state of a system at a particular point in time. For example, snapshot data may specify the contents of memory locations and variables and information about particular errors that occurred. Snapshot data may also specify particular functions that were executing at the time an error occurred. Snapshot data is relatively easy to capture and generally does not require much storage space. One drawback to using snapshot data, however, is that it only provides information relating to a particular point in time and does not provide information about events that occurred prior to the particular point in time. As a result, snapshot data has limited value in debugging software, particularly in complex computing environments.

Another approach has been to use software debugging tools to analyze software errors. Software debugging tools allow a software developer to analyze the behavior of computer software over time in response to various inputs. For example, some software debugging tools provide a sophisticated debugging environment in which a software developer can initialize values of variables and then observe how the values change over time as individual lines of code are selectively executed. Thus, unlike the snapshot data approach, software debugging tools allow a software developer to analyze the behavior of computer software over time, in response to events leading up to an error. This often provides more useful information to a software developer than individual snapshots and allows problems to be identified and addressed in a shorter amount of time. Because of the manual nature of software debugging tools, however, it is difficult, if not impossible, to simulate actual conditions under which computer software operates. For example, it is difficult to reproduce the timing and order in which multiple functions were invoked in a multi-processor/multi-threaded network management environment.

Yet another approach involves the use of a log to record information about the operation of computer system prior to an error. Software systems configured to use a log include a logging function which, when invoked, creates a data file, i.e., a log, on a persistent storage and begins writing log entries to the log. Log entries may contain a wide variety of information and different levels of detail, depending upon the requirements of a particular implementation. For example, log entries may include data that specifies attributes of functions being executed within a software system, such as a function name, source file, line number, a timestamp, as well as key data values. Log entries may be created automatically on a periodic basis or asynchronously in response to events. For example, a particular event might cause a particular function to be initiated. Also in response to the event, a corresponding log entry is made that describes details about the particular function. Since logs are created and maintained on a non-volatile storage, such as one or more disks, a large amount of detailed information can be included in logs. Thus, log entries may contain a high level of detail that is very useful to a software developer in analyzing an error. Despite the benefits provided by logs, creating and maintaining logs on a non-volatile storage can, however, consume a significant amount of system resources. One consequence of this is that logging functions are often used only very selectively and are sometimes turned off completely until after an error has already occurred. Administrative personnel are then faced with the difficult task of trying to reproduce the error under the same conditions that existed when the error originally occurred, which can be difficult to do and can require a significant amount of time.

Based on the foregoing, there is a need for an approach for facilitating the analysis of computer software errors that does not suffer from limitations of prior approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that depicts example contents of status data according to one embodiment of the invention.

FIG. 3B is a block diagram that depicts example contents of a lookup table used to process status data.

FIG. 4 is a flow diagram that depicts an approach for facilitating the analysis of computer software errors according to an embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview

II. Architecture Overview

III. Status Data Logging in Volatile Memory
IV. Moving Status Data to Non-Volatile Storage on Errors
V. Status Data Management
VI. Implementation Mechanisms I. Overview An approach for facilitating the analysis of computer software errors generally involves creating and maintaining status data in a volatile memory, such as a random access memory (RAM). The status data may indicate one or more attributes of a computing system or any of its components. For example, the status data may indicate that certain functions were invoked at certain times and provide other details about the functions. The status data may be supplemented with additional status data to indicate attributes of the computing system and its components over time. In response to detecting a specified condition, the status data is written from the volatile memory to a non-volatile memory, for example, onto one or more disks. The status data stored on the non-volatile memory may then be used to analyze the behavior of the computer software over time leading up to the error. The specified condition may be any type of condition, depending upon the requirements of a particular implementation, and the invention is not limited to any particular condition. Example conditions include, without limitation, any type of system event, such as a monitored threshold (e.g., a memory or CPU high water mark), a user interaction, such as a user-invoked transition, and any type of error condition, such as a software error.

Ii. Architecture Overview

Figure 1:
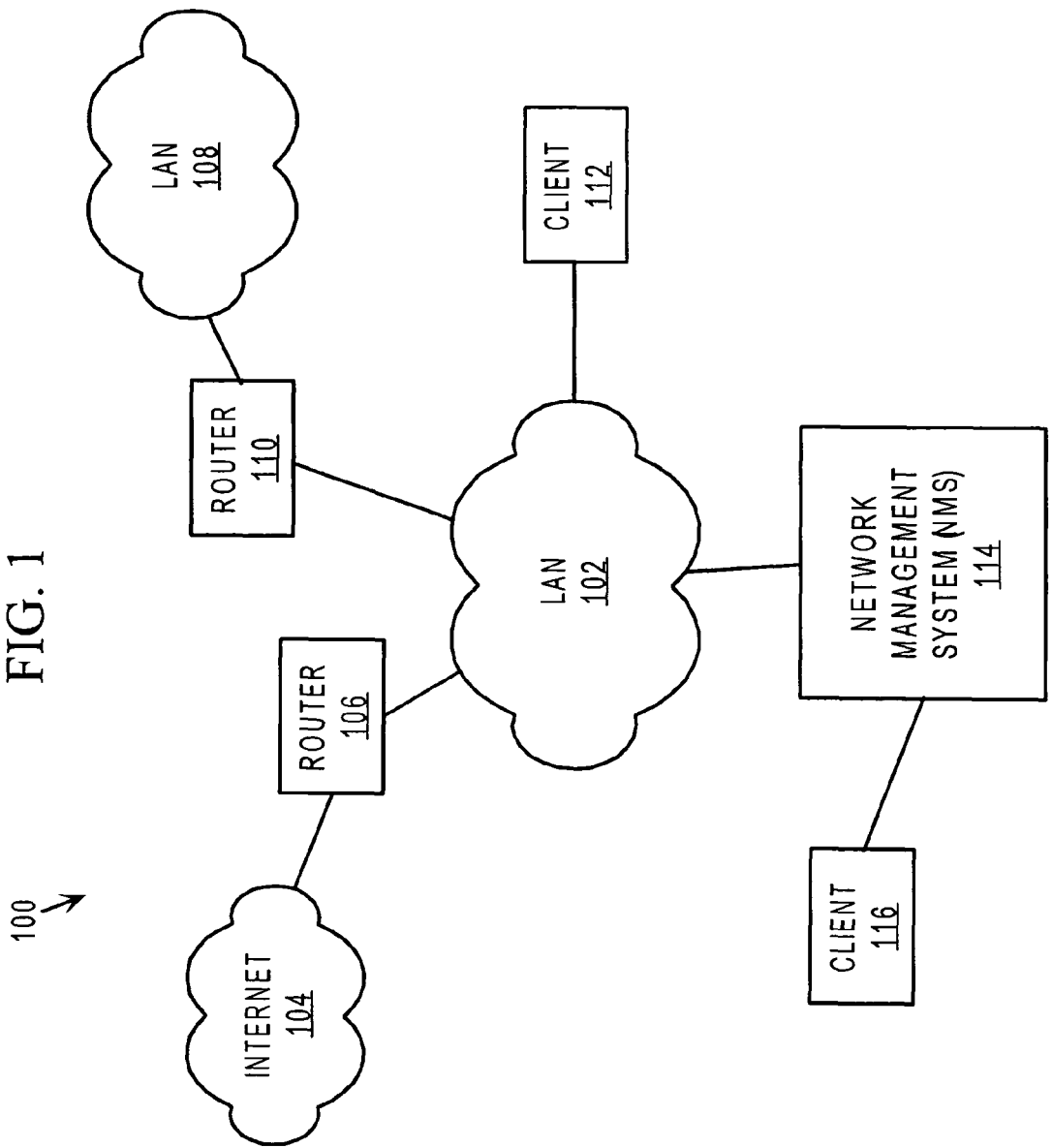
FIG. 1 is a block diagram that depicts an example architecture for facilitating the analysis of software errors according to one embodiment of the invention.

FIG. 1 is a block diagram that depicts an example architecture 100 for facilitating the analysis of computer software errors according to one embodiment of the invention. Architecture 100 includes a local area network (LAN) 102 communicatively coupled to Internet 104 via a router 106 and to a LAN 108 via a router 110. A client 112 is communicatively coupled to LAN 102. Architecture includes a network management system (NMS) 114 configured to provide network management services for architecture 100. For example, NMS 114 may allow a client 116 to configure routers 106, 110 and store configuration data for routers 106, 110 on non-volatile storage. Architecture 100 may include fewer or more elements than depicted in FIG. 1, depending upon the requirements of a particular implementation, and the invention is not limited to implementations having the particular elements of architecture 100.

Figure 2:
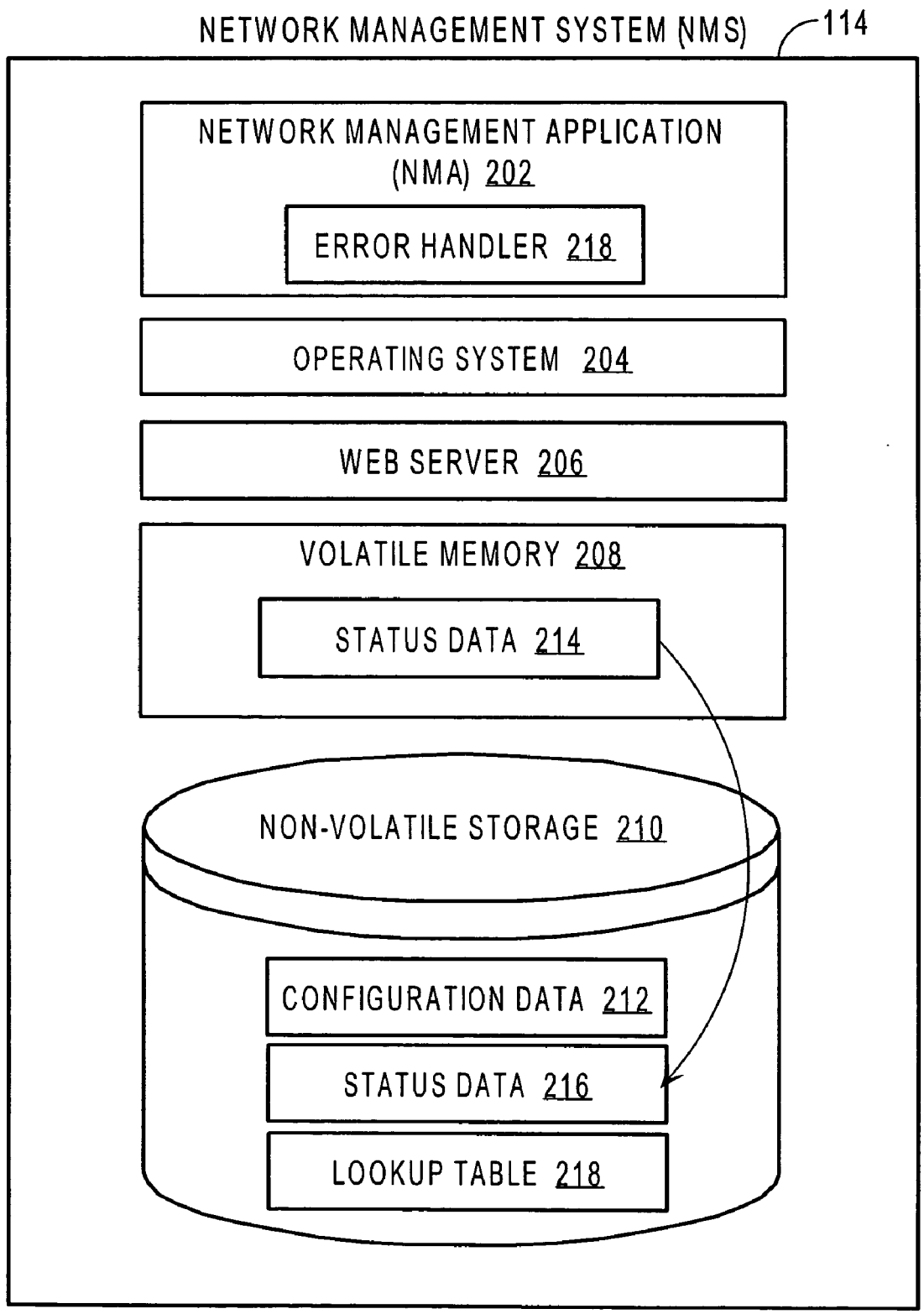
FIG. 2 is a block diagram of an example implementation of a network management system, according to one embodiment of the invention.

FIG. 2 is a block diagram of an example implementation of NMS 114, according to one embodiment of the invention. In this embodiment, NMS 114 includes a network management application (NMA) 202, an operating system 204, a Web server 206, a volatile memory 208 and a non-volatile storage 210. Operating system 204 may be any type of operating system, for example, the Solaris operating system manufactured by Sun Microsystems, Inc. Web server 206 may be any type of Web server configured to generate and provide requested Web pages to clients 112, 116. An example implementation of Web server 206 is an Apache Web server. Volatile memory 208 may be any type of volatile memory, such as a RAM. Non-volatile storage 210 may be any type of non-volatile storage, such as one or more disks, tape drives, optical media mechanisms, etc., for storing configuration data 212 that indicates the configuration of routers 106, 110.

NMS 112 may include additional elements or fewer elements than those depicted in FIG. 2, depending upon the requirements of a particular implementation, and the invention is not limited to implementations of NMS 112 having the particular elements depicted in FIG. 2.

III. Status Data Logging in Volatile Memory

According to one embodiment of the invention, NMA 202 is configured to create and maintain status data 214 in volatile memory 208. Status data 214 may include a wide variety of status data, depending upon the requirements of a particular implementation, and the invention is not limited to any particular type of status data. Examples of status data 214 include, without limitation, data that indicates the identify (file name, line number, function name) and time at which functions are invoked within NMA 202, entities that invoked the functions, intermediate and final results of the functions being performed, memory usage, swap usage, disk usage, etc. Status data 214 may be maintained in volatile memory 208 in any form, such as numeric and text data stored in arrays. According to one embodiment of the invention, status data 214 is maintained in the form of a log that includes one or more log entries. Each log entry contains information about a particular event at a particular time. For example, a log entry may specify that at a particular date and time, a particular function was initiated and that a particular amount of memory was allocated. The log entry may also specify certain key values.

IV. Moving Status Data to Non-Volatile Storage on Errors

According to one embodiment, in response to a specified condition, status data 214 is written from volatile memory 208 to status data 216 on non-volatile storage 210. As mentioned previously, any type of condition may trigger the writing of status data 214 from volatile memory 208 to status data 216 on non-volatile storage 210. For example, the specified condition may include detection of an error. Many types of error detection may be used, depending upon the requirements of a particular implementation, and the invention is not limited to any particular type of error detection. According to one embodiment of the invention, NMA 202 includes an error handler 218 that is configured to perform processing after an error has been detected. For example, error handler 218 may be configured to cause status data 214 to be written from volatile memory 208 to status data 216 on non-volatile storage 210 in response to detection of any type of abnormal processing, such as an exception condition or fatal error. NMA 202 may be configured so that error handler 216 is invoked in response to any type of abnormal processing or program exit. For example, JAVA or C++ "on exit" methods may be used to cause status data 214 to be written from volatile memory 208 to status data 216 on non-volatile storage 210 in response to an error.

The format and content of status data 216 written to non-volatile storage 210 may be the same as or different than the format and content of status data 214 in volatile memory 208. Status data 216 may include all of status data 214, as well as other data obtained from other sources. For example, status data 214 may include alphanumeric codes that correspond to text messages. The use of alphanumeric codes in status data 214 reduces the amount of processing and storage resources that are consumed to store status data 214 in volatile memory 208. When status data 214 is to be written to non-volatile storage 210, the contents of status data 214 may be examined to identify any alphanumeric codes. Additional information corresponding to the alphanumeric codes is retrieved and included in status data 216. For example, status data 214 may include a set of alphanumeric codes that correspond to text messages stored on, for example, non-volatile storage 210. A lookup table 218 stored on non-volatile memory is used to identify text messages that correspond to the alphanumeric codes. The text messages are added to status data 216, in addition to, or in place of the alphanumeric codes. This approach allows status data 214 to consume fewer system resources and status data 216 to be more "user friendly" and contain more information useful to a user during examination of status data 216.

FIG. 3A is a block diagram that depicts example contents of status data 214 according to one embodiment of the invention. In this example, status data 214 is in the form of a table that includes entries 300, where each entry includes a timestamp value, as indicated by column 302, an event code, as indicated by column 304, and a source, as indicated by column 306. For example, entry 308 includes data that indicates that an event associated with event code "2387" occurred on Apr. 22, 2004 at the time of 12:37:32 and is associated with, e.g., initiated by, Process A.

FIG. 3B is a block diagram that depicts example contents of lookup table 218. In this example, lookup table 218 is in the form of a table that includes entries 350, where each entry includes an event code, as indicated by column 352, and additional information, as indicated by column 354. For example, entry 356 includes data that the additional information "Invocation of Function ABC" is associated with event code "2387". Thus, status data 216 may include an entry that indicates that on Apr. 22, 2004 at the time of 12:37:32, Process A invoked Function ABC. The event code "2387" may also be included in status data 216.

The example depicted in FIGS. 3A and 3B is a simple example for purposes of explanation only, and is not intended to limit the invention to the particular data depicted therein. Additional data of any type may be included in status data 214 and 216.

V. Status Data Management

In most implementations, there is some practical limit to the amount of volatile memory 208 that can be allocated to status data 214. Therefore, according to one embodiment of the invention, the maximum amount of volatile memory 208 allocated to status data 214 may be specified, for example, through a graphical user interface (GUI) on NMS 114 or via configuration data provided to NMS 114. For example, client 116 may generate configuration data that specifies the maximum amount of volatile memory 208 allocated to status data 214 and provide the configuration data to NMS 114, which stores the configuration data on non-volatile storage 210. According to one embodiment of the invention, when the size of status data 214 reaches the maximum amount of volatile memory 208 allocated to status data 214, then the oldest status data in status data 214 is discarded. Status data may be discarded on an entry-by-entry basis, or some other basis, for example, by block of data, depending upon the requirements of a particular implementation.

FIG. 4 is a flow diagram 400 that depicts an approach for facilitating the analysis of computer software errors according to an embodiment of the invention. In step 402, NMA 202 is configured to perform logging in volatile memory 208. As previously described, this may be accomplished by a user configuring NMA 202 via a GUI on NMS 114, or by client 116 providing configuration data to NMS 114. In step 404, NMA initiates logging of status data 214 in volatile memory 208. In step 406, a portion of status data 214 is discarded if the amount of volatile memory 208 designated for storing status data 214 is met or exceeded. As previously described, the amount of volatile memory 208 designated for storing status data 214 may be specified when logging is configured, e.g., via a GUI on NMS 114 or via configuration data. In step 408, status data 214 is written from volatile memory 208 to status data 216 on non-volatile storage 210 in response to a specified condition, such as the detection of an error in NMA 202. Logging of status data 214 in volatile memory 208 may continue thereafter.

The approach described herein for facilitating the analysis of computer software errors requires fewer system resources than conventional approaches since status data is logged to volatile memory and then written to non-volatile memory only after a specified condition is detected. Thus, system resources do not have to be expended writing status data to non-volatile storage until it is known that the status data is needed. In some circumstances, this allows large amounts of status data to never be written to non-volatile storage and ultimately deleted from volatile memory when the status data memory limit is met or exceeded. The use of alphanumeric characters or codes in place of text strings further reduces the amount of volatile memory consumed by status data. Yet, the alphanumeric codes are substituted with more information, such as text strings, when it is known that the status data will be needed, i.e., in response to an error.

VI. Implementation Mechanisms

Figure 5:
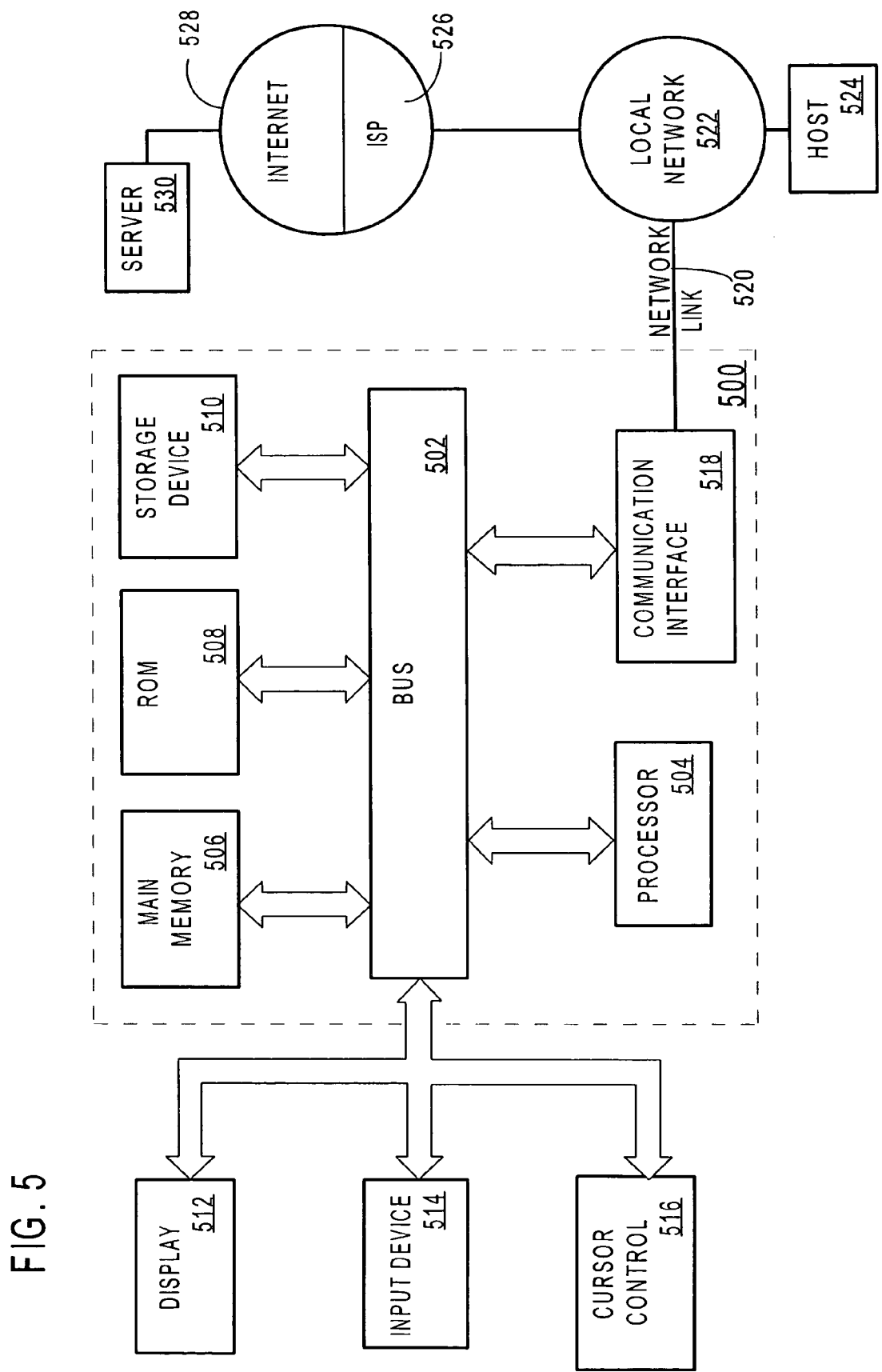
FIG. 5 is a block diagram of a computer system on which embodiments of the invention may be implemented.

Although embodiments of the invention have been described herein in the context of facilitating the analysis of software errors in a network management system, the invention is not limited to this context and is applicable to any type of computer software. Furthermore, although the approach has been described in the context of a network management architecture, the invention is not limited to this context and is applicable to any type of computing architecture. FIG. 5 is a block diagram that illustrates an example computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing status data comprising the machine-implemented steps of:

a network management application performing, prior to detecting a specified error condition in the network management application, logging in a volatile memory, status data that identifies one or more functions that have been invoked by the network management application and an amount of memory that has been allocated from invoking the functions; and the network management application performing, in response to detecting the specified error condition in the network management application prior to an occurrence of an actual error in the network management application, the actual error corresponding to the specified error condition, causing the status data stored in the volatile memory to be written to a non-volatile storage.

2. The method as recited in claim 1, further comprising the machine-implemented step of generating and storing in a volatile memory additional status data that indicates one or more attributes of one or more additional functions that have been performed by the network management application.

3. The method as recited in claim 1, further comprising the machine-implemented step of in response to detecting that the status data has reached a specified size, deleting at least a portion of the status data from the volatile memory.

4. The method as recited in claim 1, further comprising the machine-implemented step of formatting the status data prior to causing the status data to be written to the non-volatile storage.

5. The method as recited in claim 1, further comprising the machine-implemented step of supplementing the status data with additional status data prior to causing the status data to be written to the non-volatile storage.

6. The method as recited in claim 1, further comprising the machine-implemented steps of:

examining the status data stored in the volatile memory to identify a first status data item contained in the status data;

retrieving text data based upon the identified first status data item; and causing the text data to be stored on the non-volatile storage.

7. The method as recited in claim 1, wherein the specified condition includes one or more of an error in the network management application, a system event and a user interaction.

8. A computer-readable storage medium for managing status data, the machine-readable medium carrying one or more sequences of instructions which, when executed by one or more processors, cause the performance of the steps of:

a network management application performing, prior to detecting a specified error condition in the network management application, logging in a volatile memory status data that identifies of one or more functions that have been invoked by the network management application and an amount of memory that has been allocated from invoking the functions; and the network management application performing, in response to detecting the specified error condition in the network management application prior to an occurrence of an actual error in the network management application, the actual error corresponding to the specified error condition, causing the status data stored in the volatile memory to be written to a non-volatile storage.

9. The computer-readable storage medium as recited in claim 8, further comprising one or more additional instructions which, when executed by the one or more processors, cause the performance of generating and storing in a volatile memory additional status data that indicates one or more attributes of one or more additional functions that have been performed by the network management application.

10. The computer-readable storage medium as recited in claim 8, further comprising one or more additional instructions which, when executed by the one or more processors, cause the performance of in response to detecting that the status data has reached a specified size, deleting at least a portion of the status data from the volatile memory.

11. The computer-readable storage medium as recited in claim 8, further comprising one or more additional instructions which, when executed by the one or more processors, cause the performance of formatting the status data prior to causing the status data to be written to the non-volatile storage.

12. The computer-readable storage medium as recited in claim 8, further comprising one or more additional instructions which, when executed by the one or more processors, cause the performance of supplementing the status data with additional status data prior to causing the status data to be written to the non-volatile storage.

13. The computer-readable storage medium as recited in claim 8, further comprising one or more additional instructions which, when executed by the one or more processors, cause the performance of:

examining the status data stored in the volatile memory to identify a first status data item contained in the status data;

retrieving text data based upon the identified first status data item; and causing the text data to be stored on the non-volatile storage.

14. The computer-readable storage medium as recited in claim 8, wherein the specified condition includes one or more of an error in the network management application, a system event and a user interaction.

15. An apparatus for managing status data, the apparatus being configured to:

a network management application performing, prior to detecting a specified error condition in the network management application, logging in a volatile memory, status data that identifies one or more functions that have been invoked by the network management application and an amount of memory that has been allocated from invoking the functions; and the network management application performing, in response to detecting the specified error condition in the network management application prior to an occurrence of an actual error in the network management application, the actual error corresponding to the specified error condition, causing the status data stored in the volatile memory to be written to a non-volatile storage.

16. The apparatus as recited in claim 15, wherein the apparatus is further configured to generate and store in a volatile memory additional status data that indicates one or more attributes of one or more additional functions that have been performed by the network management application.

17. The apparatus as recited in claim 15, wherein the apparatus is further configured to in response to detecting that the status data has reached a specified size, deleting at least a portion of the status data from the volatile memory.

18. The apparatus as recited in claim 15, wherein the apparatus is further configured to format the status data prior to causing the status data to be written to the non-volatile storage.

19. The apparatus as recited in claim 15, wherein the apparatus is further configured to supplement the status data with additional status data prior to causing the status data to be written to the non-volatile storage.

20. The apparatus as recited in claim 15, wherein the apparatus is further configured to:

examine the status data stored in the volatile memory to identify a first status data item contained in the status data;

retrieve text data based upon the identified first status data item; and cause the text data to be stored on the non-volatile storage.

21. The apparatus as recited in claim 15, wherein the specified condition includes one or more of an error in the network management application, a system event and a user interaction.

22. An apparatus for managing status data, the apparatus comprising:

means for a network management application performing, prior to detecting a specified error condition in the network management application, logging in a volatile memory, status data that identifies one or more functions that have been invoked by the network management application and an amount of memory that has been allocated from invoking the functions; and means for the network management application performing, in response to detecting the specified error condition in the network management application prior to an occurrence of an actual error in the network management application, the actual error corresponding to the specified error condition, causing the status data stored in the volatile memory to be written to a non-volatile storage.

23. The apparatus as recited in claim 22, further comprising means for generating and storing in a volatile memory additional status data that indicates one or more attributes of one or more additional functions that have been performed by the network management application.

24. The apparatus as recited in claim 22, further comprising means for in response to detecting that the status data has reached a specified size, deleting at least a portion of the status data from the volatile memory.

25. The apparatus as recited in claim 22, further comprising means for formatting the status data prior to causing the status data to be written to the non-volatile storage.

26. The apparatus as recited in claim 22, further comprising means for supplementing the status data with additional status data prior to causing the status data to be written to the non-volatile storage.

27. The apparatus as recited in claim 22, further comprising means for:

examining the status data stored in the volatile memory to identify a first status data item contained in the status data;

retrieving text data based upon the identified first status data item; and causing the text data to be stored on the non-volatile storage.

28. The apparatus as recited in claim 22, wherein the specified condition includes one or more of an error in the network management application, a system event and a user interaction.

* * * * *